(12) United States Patent
Hong et al.

(10) Patent No.: US 7,414,927 B2
(45) Date of Patent: Aug. 19, 2008

(54) ACTUATOR OF OPTICAL PICK-UP DEVICE

(75) Inventors: Sam Nyol Hong, Suwon-si (KR); In Ho Choi, Seongnam-si (KR); Kyung Taek Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 561 days.

(21) Appl. No.: 11/034,513

(22) Filed: Jan. 11, 2005

(65) Prior Publication Data

US 2005/0152239 A1    Jul. 14, 2005

(30) Foreign Application Priority Data

Jan. 14, 2004   (KR)   ............. 10-2004-0002678
Jan. 14, 2004   (KR)   ............. 10-2004-0002679
Jan. 14, 2004   (KR)   ............. 10-2004-0002680

(51) Int. Cl.
*G11B 7/00* (2006.01)

(52) U.S. Cl. .................. 369/44.15; 369/44.14

(58) Field of Classification Search ............... None
See application file for complete search history.

(56) References Cited

U.S. PATENT DOCUMENTS

| 4,669,823 | A | * | 6/1987 | Iguma et al. | ............. 369/44.15 |
| 5,305,151 | A | * | 4/1994 | Kakimoto et al. | ........ 369/44.16 |
| 5,841,593 | A |   | 11/1998 | Ikegame et al. | |
| 5,986,983 | A | * | 11/1999 | Simpson et al. | .......... 369/44.14 |
| 2002/0021651 | A1 | | 2/2002 | Nyol et al. | |

FOREIGN PATENT DOCUMENTS

| JP | 01-236434 | 9/1989 |
| JP | 07-121893 | 5/1995 |
| JP | 2000-306250 | 11/2000 |

* cited by examiner

*Primary Examiner*—Muhammad Edun
(74) *Attorney, Agent, or Firm*—Lee, Hong, Degerman, Kang & Schmadeka

(57) ABSTRACT

An actuator of an optical pick-up device includes two fixing frames, a lens holder disposed between the fixing frames and provided with a focusing lens, coils, and a reflection mirror having a central portion thinner than other portions where the coils are located, springs supporting the lens holder, the springs connecting two points of each fixing frame to the lens holder, each spring having one or more bends, a permanent magnet disposed facing the coils to generate magnetic field, and a yoke forming a path of the magnetic field generated by the permanent magnet.

23 Claims, 13 Drawing Sheets

ACTUATOR OF OPTICAL PICK-UP DEVICE

CROSS-REFERENCE TO RELATED APPLICATIONS

Pursuant to 35 U.S.C. § 119(a), this application claims the benefit of earlier filing date and right of priority to Korean Applications, No. 2678/2004, No. 2679/2004, and No. 2680/2004, filed on Jan. 14, 2004, the contents of which are hereby incorporated by reference herein in their entirety.

BACKGROUND OF THE INVENTION

1. Field of the Invention

The present invention relates to an actuator used for driving an optical pick-up device writing or reading data on or from an optical disk.

2. Description of the Related Art

Generally, an optical pick-up device is used for a computer, a digital video disk (DVD) player and the like to write and read data on or from an optical disk such as a compact disk, a digital video disk, a blue ray disk, and so forth.

In recent years, as a digital device such as a laptop computer, a camcorder and a digital camera has been reduced in weight and size, it has required to miniaturize the size of the data storage media.

Particularly, it has been continuously studied to apply the optical disk to a mobile device such as a mobile phone and a personal digital assistant (PDA). In order to apply the optical disk to such a mobile device, it is badly required to miniaturize the size of the optical pick-up device.

The size reduction of the optical pick-up device has been hobbled by an actuator for moving a focusing lens to uniformly maintain a distance between the focusing lens and the optical disk and tracing a track on the optical disk to write or read data on or from the optical disk.

The optical pick-up device converts a laser beam eradiated from a laser diode into an optical signal and further converts the optical signal into an electrical signal, thereby reading the recorded data.

The actuator of the optical pick-up device is designed to two-dimensionally move in focusing and tracking directions to safely focus the laser beam on the optical disk even when outer impact is applied. In recent years, to provide more precise motion, an actuator that can move in rolling and pitching directions as well as in the focusing and tracking directions has been developed.

FIGS. 1 through 4 shows a prior optical writing/reading device.

A prior optical writing/reading device includes an optical pick-up device 50 on which a focusing lens 49 is mounted, an optical pick-up motor 60 for moving the optical pick-up device 50 to a proper position, a lead screw 20 connected to a rotational shaft of the optical pick-up motor 60, a rack gear 30 designed to be engaged with the lead screw 20, a guide feeder 10 coupled to the rack gear 30, an optical pick-up moving shaft 21 guiding a reciprocal motion of the guide feeder 10, and a main shaft 22 installed on an opposite side of the optical pick moving shaft 21 to guide the motion of the optical pick-up device.

As the optical pick up motor 60 is operated, the lead screw 20 rotates and the rack gear 30 engaged with the lead screw 20 moves, thereby moving the optical pick-up device 50 to a desired position.

As shown in FIG. 2, the optical pick-up actuator 40 is comprised of a movable part moving a focusing lens 49 in the focusing and tracking directions and a stationary part for supporting the movable part and generating magnetic field.

The movable part has a coil cooperating with a permanent magnet 43 provided on the stationary part to locate the focusing lens 49 to the desired position.

That is, the stationary part includes the permanent magnet 43 generating magnetic field, a yoke 42 forming a path of the magnetic field, the fixing frame 41 having a main board (not shown), and wire-shaped springs 47 each having a first end 47a fixed on the fixing frame 41 and a second end fixed on the lens holder 44 to support the lens holder 44 and supply electric current to the lens holder 44.

The movable part includes the focusing lens 49 focusing a laser beam eradiated from the laser diode on a recording layer of the optical disk, a lens holder 44 holding the focusing lens 49, tracking coils 45 installed on both sides of the lens holder 44 to drive the lens holder 44 in the tracking direction, a focusing coil 46 wound around the lens holder 44 to drive the lens holder 44 in the focusing direction, and a spring fixing unit 48 fixing the spring assembly 47 on the lens holder 44.

The movable part should be designed having a desired frequency property by being fixed by a support having a predetermined rigidity and a predetermined damping property. In addition, the movable part should be designed avoiding unnecessary vibration such as rotation or twist to effectively move in the focusing and tracking directions and reduce the optical signal error.

That is, when the movable part drives in the focusing direction, the lens holder 44 should vertically move without rotating in a direction of an X-axis (in the pitching direction shown in FIG. 5). Therefore, as shown in FIG. 3, the spring assembly 47 is comprised of two lower springs and two upper springs stacked on the lower springs that are installed on both sides of the lens holder 44, being extending from the fixing frame 41.

As shown in FIG. 4, in order to eliminate the space limitation in designing the optical pick-up device by reducing a thickness of the actuator, it has been developed that springs 97 may be comprised of one lower spring and one upper spring stacked on the lower spring.

However, in this case, when the optical pick-up device moves in the focusing direction, the lens holder 44 may rotate in the direction of the X-axis, causing the undesired inclination.

Even when the spring assembly 47 is formed as shown in FIG. 3, an elastic coefficient may be varied when the spring is twisted or tensioned during the manufacturing process.

The reduction of the size of the optical reading/writing device may be further limited by a supporting structure supporting the optical pickup device for reading/writing the data from/on the optical disk.

FIG. 5 shows a prior supporting structure for supporting the optical pickup device of the optical reading/writing device.

Referring to FIG. 5, the optical reading/writing device includes a base 70, a rubber damper 71 formed on the base 70, a sled base 72 fixed on the rubber damper 71.

The base supports the optical pickup actuator 40 and provides a space for installing the optical pickup actuator 40. The rubber damper 71 absorbs vibration and impact generated from the actuator 40 or an external side to allow the optical reading/writing device to smoothly operate.

The sled base 72 is provided with a main shaft holder 73 on which a main shaft 22 is formed.

The main shaft 22 guides the movement of a pickup base 51 formed on the optical pickup actuator 40.

A spindle motor 74 is formed on a side portion of the sled base 72 to drive a turntable 75 rotating the optical disk 76.

The above-described supporting structure does not meet a drop in the size reduction tendency of digital devices such as a laptop computer, a camcorder, a digital camera, and the like.

That is, such a supporting structure limits the reduction in the size and weight of the optical reading/writing device.

SUMMARY OF THE INVENTION

Accordingly, the present invention is directed to an actuator of an optical pick-up device that substantially obviates one or more problems due to limitations and disadvantages of the related art.

An object of the present invention is to provide an actuator of an optical pick-up device, which can effectively drive the optical pick-up device and reduce the size of the optical pick-up device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an actuator of an optical pick-up device comprising: two fixing frames; a lens holder disposed between the fixing frames and provided with a focusing lens, coils, the lens holder having a central portion thinner than a portion where the coils are located; springs supporting the lens holder, the springs connecting two points of each fixing frame to the lens holder, each spring having one or more bends; a permanent magnet disposed facing the coils to generate magnetic field; and a yoke forming a path of the magnetic field generated by the permanent magnet.

In another aspect of the present invention, there is provided an actuator of an optical pick-up device comprising two fixing frames; a lens holder disposed between the fixing frames and provided with a focusing lens and a space portion for an optical path, the space portion being formed on a lower portion of the lens holder; springs supporting the lens holder, the springs connecting the fixing frames to the lens holder; and a driving force generating unit to move the lens holder in tracking and focusing directions.

In still another aspect of the present invention, there is provided an actuator of an optical pick-up device comprising a fixing frame; a lens holder provided with a focusing lens and a space portion, the space portion being formed thinly at a lower center portion for an optical path in a tracking direction; springs supporting the lens holder, the springs connecting the fixing frame to the lens holder, each spring having one or more bends; a driving force generating unit for moving the lens holder in the tracking and focusing directions, the driving force generating unit comprising coils, a permanent magnet generating magnetic field, and a yoke providing a path for the magnetic field.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
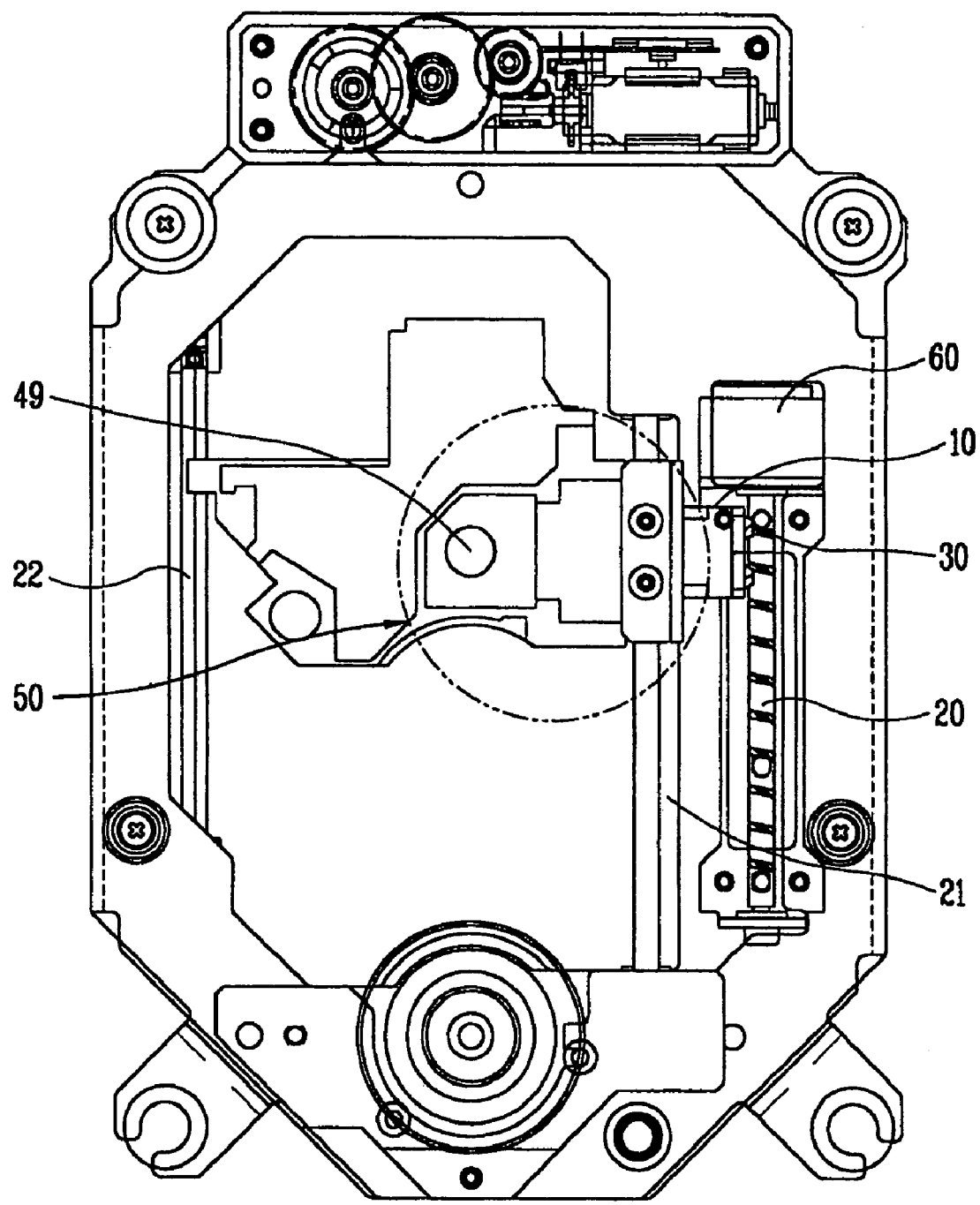
FIG. 1 is a plane view of a prior optical writing/reading device.
Figure 2:
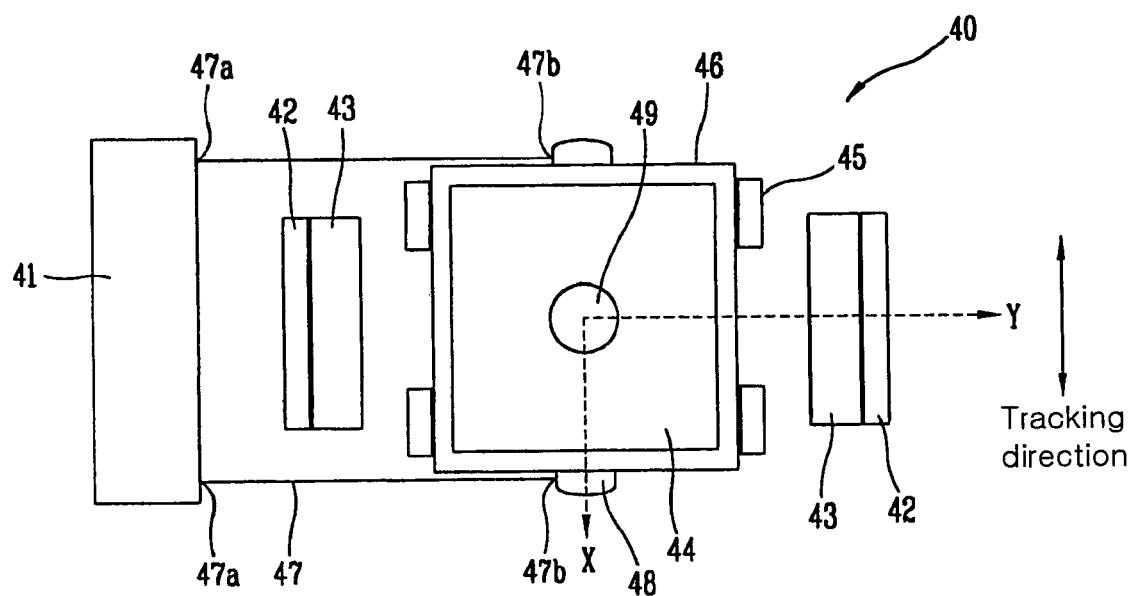
FIG. 2 is a view of an actuator of a prior optical pick-up device.
Figure 3:
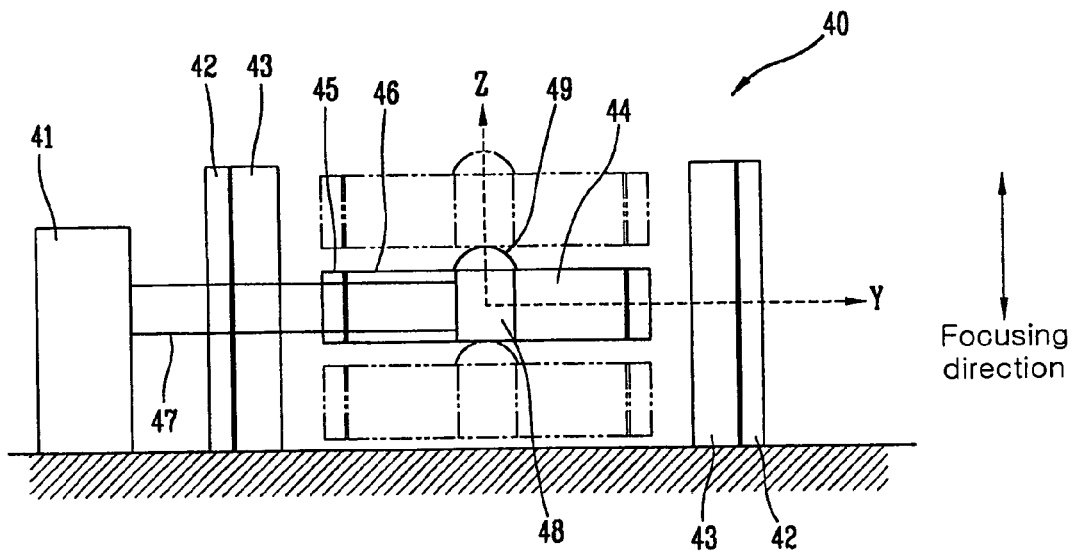
FIGS. 3 and 4 are views illustrating a focusing operation of an actuator of an prior optical pick-up device.
Figure 4:
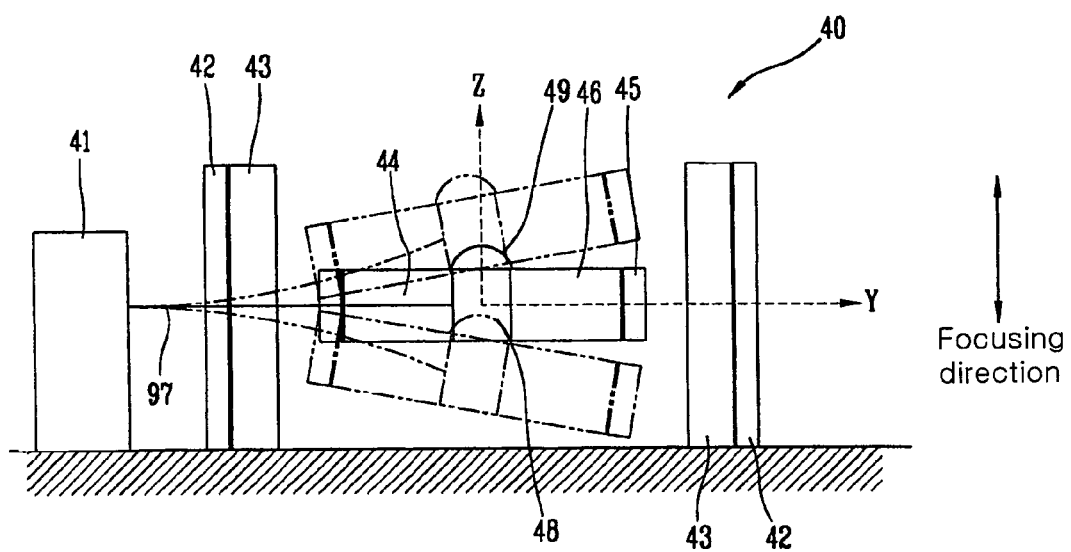
Figure 5:
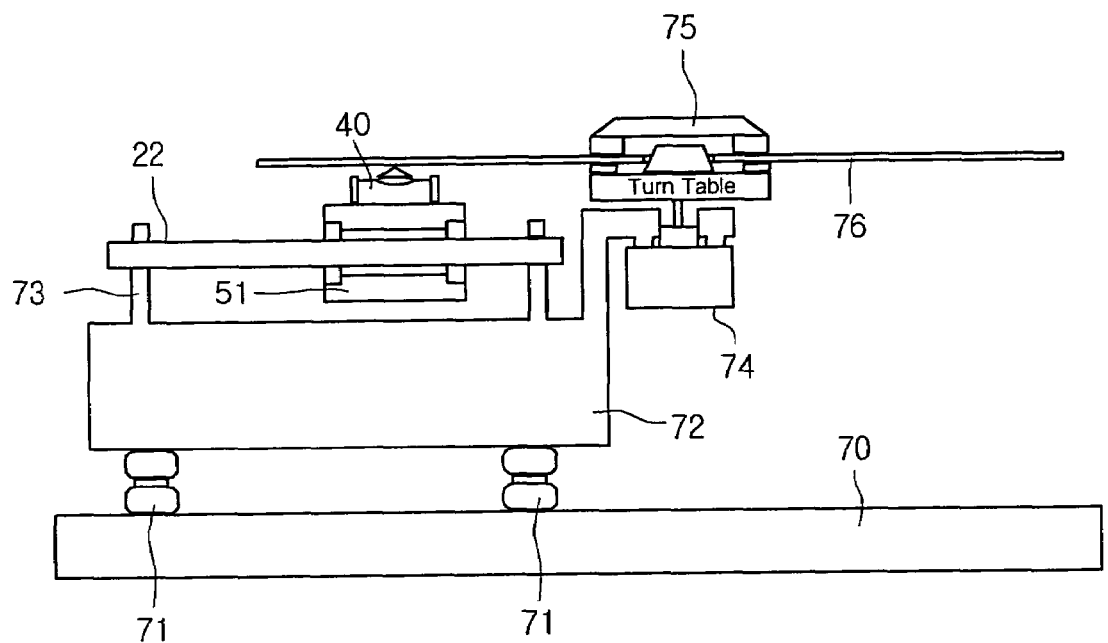
FIG. 5 is a view illustrating a structure supporting an optical pickup device.
Figure 6:
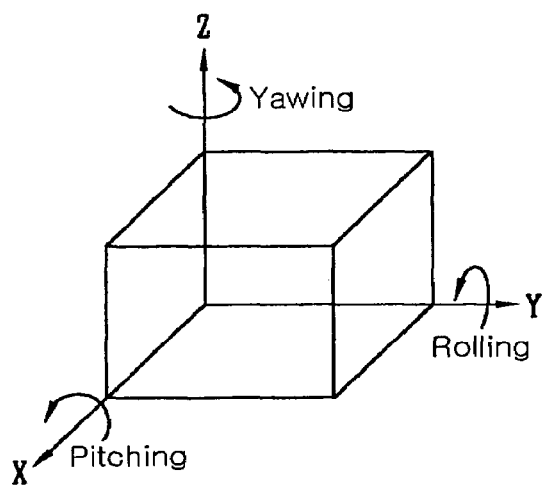
FIG. 6 is a view illustrating rotational directions.
Figure 7:
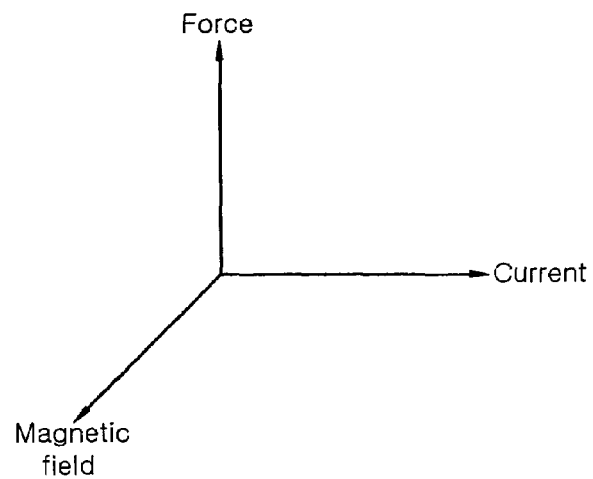
FIG. 7 is a view illustrating Lorentz force.

FIGS. 6 and 7 illustrates an operational theory of an actuator of an optical pick-up device. FIG. 6 illustrates rotational directions and FIG. 7 illustrates Lorentz force.

Rotation around X, Y and Z-axes are respectively called a pitching, rolling and yawing.

As shown in FIG. 7, force applied to the actuator is generated by the combination of magnetic field formed by a permanent magnet and current flowing along a coil.

Figure 8:
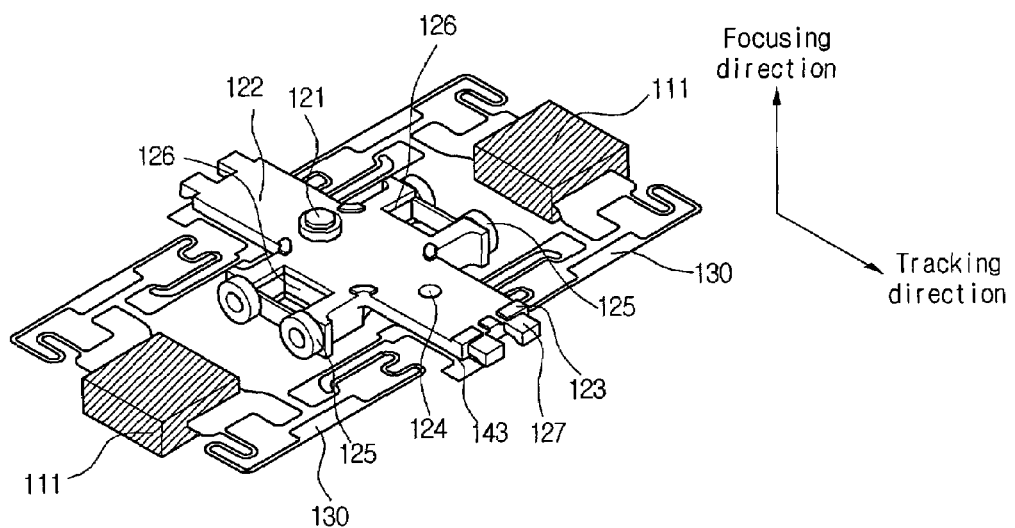
FIG. 8 is a view illustrating a lens holder, a fixing frame and a spring according to an embodiment of the present invention.
Figure 9:
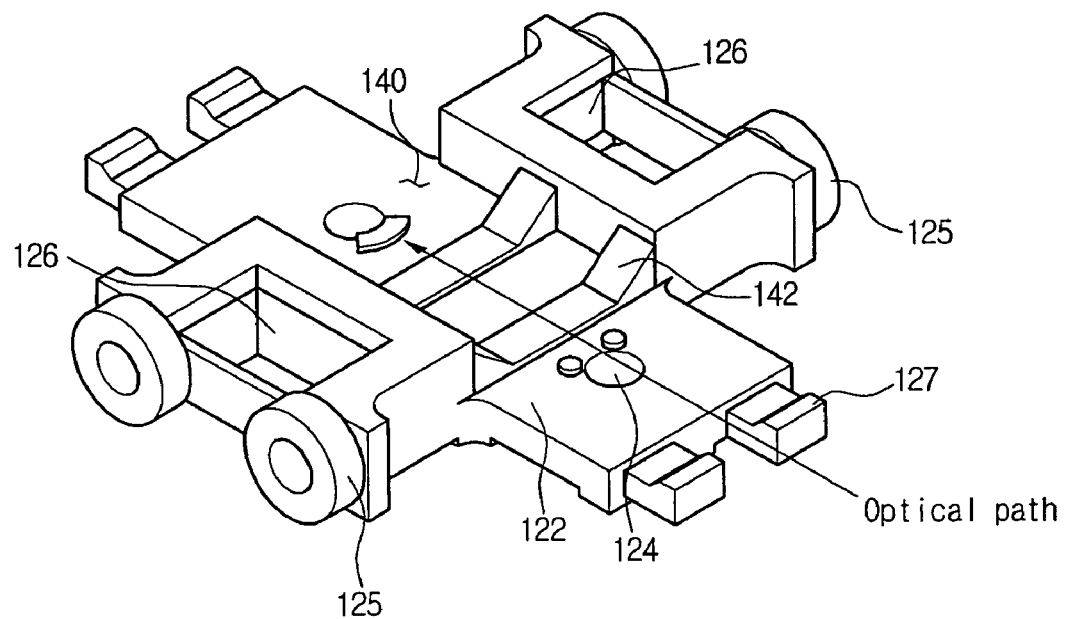
FIG. 9 is a rear perspective view of a lens holder according to an embodiment of the present invention.
Figure 10:
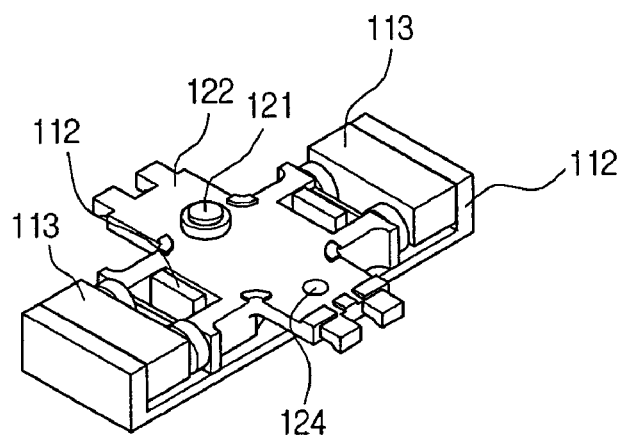
FIG. 10 is a view illustrating a lens holder, a yoke and a permanent magnet according to an embodiment of the present invention.

FIGS. 8 through 10 show an actuator of an optical pick-up device according to an embodiment of the present invention.

FIG. 8 illustrates a lens holder, a fixing frame and a spring according to an embodiment of the present invention and FIG.

9 shows a rear perspective view of a lens holder according to an embodiment of the present invention.

FIG. 10 illustrates a lens holder, a yoke and a permanent magnet according to an embodiment of the present invention.

As shown in the drawings, the inventive optical pick-up actuator includes a movable unit equipped with a focusing lens to move in focusing and tracking directions and a stationary unit supporting the movable part and generating magnetic field.

The stationary unit includes a pair of fixing frames 111 facing each other, a pair of permanent magnets 113 generating the magnetic field, a pair of yokes 112 fixed by pick-up bases 114 to generate a magnetic field path. Leaf springs 130 supports the movable part 120, each having first and second ends respectively fixed on the fixing frame 111 and a spring fixing portion 143 of a lens holder 122.

Particularly, each of the springs 130 is designed in a single step to overcome a space limitation by minimizing a thickness (in a direction of the Z-axis) of the lens holder 122.

The lens holder 122 is designed to be supported at its four points to prevent the unexpected rotation from occurring and to perform the effective movement in the focusing and tracking directions.

The focusing coils 126 for focusing-driving the lens holder 122 are formed in a rectangular shape and inserted in both sides of the lens holder 122.

In the drawing, it is shown that three sides of the focusing coil 126 are located in the lens holder 12.

The tracking coils 125 for tracking-driving the lens holder 122 is formed in a circular-shape. Two tracking coils 125 are provided at each of both sides of the lens holder 122.

Although not being shown in the drawing, the lens holder 122 is provided with a guide for coiling the tracking and focusing coils 125 and 126 so that the tracking and focusing coils 125 and 126 can be easily wound around thereof.

The lens holder 122 is provided with a guide hole 124, a dummy mass 123 and projections 127.

The focusing lens 121 is installed on an eccentric position from the center of the lens holder 122 so that the data can be read or written from the innermost circumference of the optical disk.

The dummy mass 123 is provided to maintain the weight center of the lens holder 122, which is deviated by the focusing lens 121 installed on the eccentric position from the center of the lens holder 122. Therefore, the dummy mass 123 is provided on an opposite position to the eccentric position of the focusing lens 121.

The guide hole 124 functions to accurately locate the lens holder 122 on a jig in the course of assembling the actuator.

The projections 127 are formed on both sides of the lens holder 122. Coils connected to the tracking and focusing coils 125 and 126 are wound around the projections 127 to receive electric power from the springs 130.

The lens holder 122 is provided at a rear surface with a space 140.

The space 140 is provided to minimize a thickness of the lens holder 122. That is, the space 140 forms the optical path using a portion of the thickness of the lens holder 122.

A central portion of the lens holder 122 is designed to be thinner than those of the both sides on which the focusing and tracking coils 126 and 125 are formed.

Since the central portion of the lens holder 122 is designed to be thinner, a reinforcing member 142 is provided to compensate for the rigidity of the lens holder 122.

Figure 11:
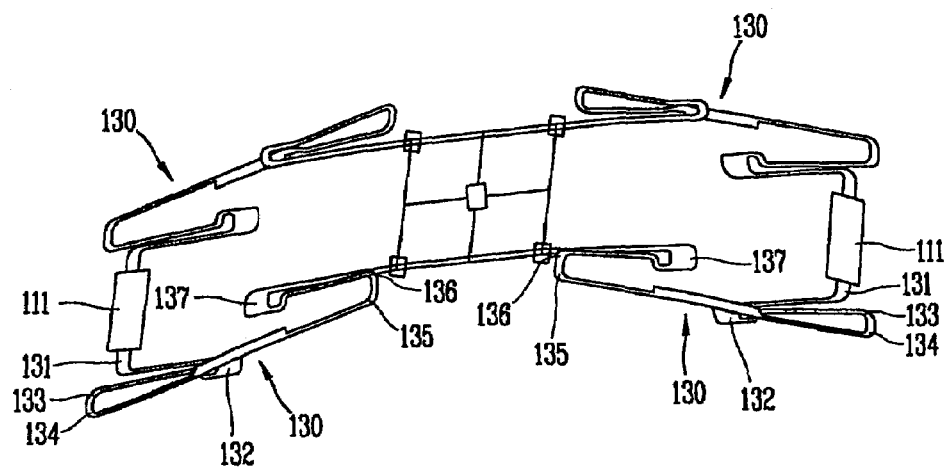
FIG. 11 is a view illustrating a varied state of springs as a lens holder is driven in a focusing direction according to an embodiment of the present invention.
Figure 12:
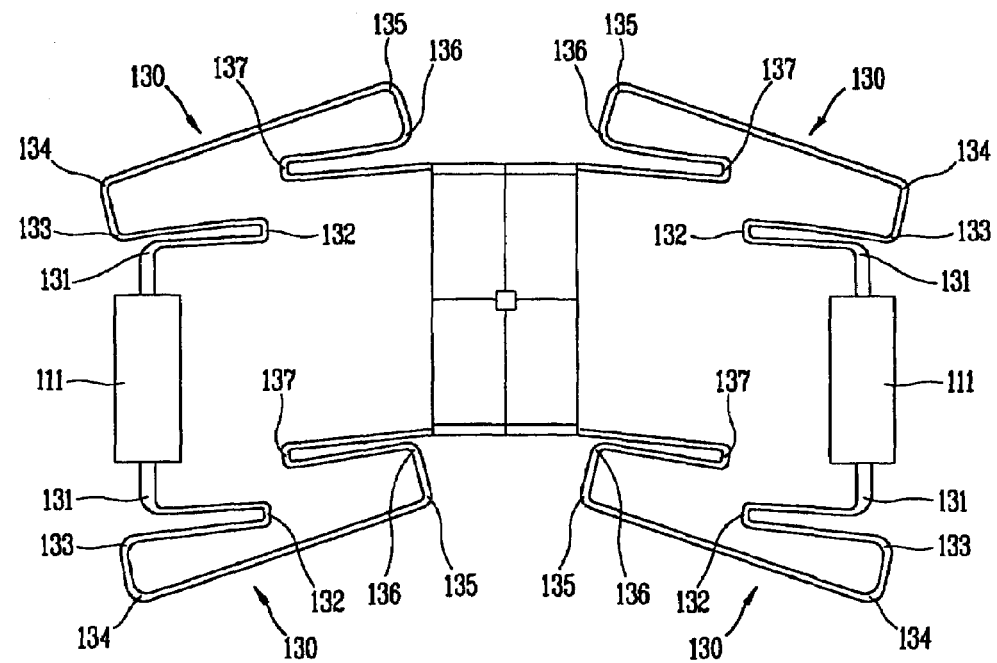
FIG. 12 is a view illustrating a varied state of springs as a lens holder is driven in a tracking direction according to an embodiment of the present invention.

FIGS. 11 and 12 show an operation of the spring 130 in the optical pickup actuator.

The spring 130 depicted in FIGS. 11 and 12 may be different in the shape from that depicted in FIG. 8. However, it should be noted that the spring 130 is one of a variety of modified examples that will be illustrated later.

According to the present invention, by forming a plurality of bend portions 131, 132, 133, 134, 135, and 136 on the spring 130, the movement range of the lens holder 122 can be enlarged by twist and bend variations at the bend portions 131, 132, 133, 134, 135, and 136 of the spring 130 without depending on a tensioning variation of the springs 130. In addition, since the springs 130 are less sensitive with respect to a variation of an elastic coefficient according to the twist or bend of the springs 130 that may be incurred in the course of fixing the springs 130 on the lens holder 122 and the fixing frame 111, the driving property of the actuator can be improved.

In addition, by reducing the rigidity of the spring 130 while maintaining a short distance between the fixing frame 111 and the lens holder 122, the inclined angles in the tracking, focusing, rolling and pitching directions can be controlled.

In short, by forming the bends, the assembling error caused by the twisting or bending of the spring, which is incurred during the installing process of the spring, can be minimized even when the movable unit having a small mass is controlled.

In addition, since the tracking or focusing operation is realized using the bends of the spring, it becomes possible to provide an actuator having a good driving property.

Preferably, the springs 130 are installed on the same horizontal plane to effectively control the movement of the lens holder 122 and reduce the thickness of the lens holder 122.

In short, the spring fixing portions 143 where the first ends of the springs 130 are coupled to the lens holder 122 are preferably formed on the same horizontal plane.

In addition, portions where the second ends of the springs 130 are fixed are preferably formed on the same horizontal plane as that where the spring fixing portions 143 are formed.

The one-step springs 130 support the both ends of the lens holder 122 to prevent the lens holder 122 from being unexpectedly inclined when the movable part 120 is driven.

In addition, since rigidity against the driving force of the lens holder 122 in each direction is reduced, the electromotive force required in controlling the lens holder is reduced. Particularly, since the rigidity in the pitching direction is remarkably lowered, the actuator can be applied as a multiple driving actuator.

That is, by properly apply the electric current to the focusing and tracking coils 126 and 125, the inclined angle control becomes possible according to Lorentz force.

In the above-described actuator, the magnetic filed is formed around the lens holder 122 by the permanent magnets 113. When the current is applied to the focusing coil 126 disposed in the magnetic field, the electromotive force is generated on the focusing coil 126 to drive the lens holder 122 in the focusing direction (in the vertical direction). Likewise, when the current is applied to the tracking coils 125 located in the magnetic field, the electromotive force is generated on the tracking coils 125 to drive the lens holder 122 in the tracking direction (in the left and right directions).

In short, the actuator drives the lens holder 122 to read data recorded on the recording layer of the optical disk by maintaining a focused spot formed on the focusing lens 121 at a predetermined size.

An actuator having the focusing and tracking coils formed on the lens holder such that the focusing and tracking coils move together with the lens holder is called a moving coil type actuator. An actuator having the permanent magnet formed on the lens holder 122 such that the permanent magnet moves together with the lens holder is called a moving magnet type actuator.

However, it should be noted that the present invention can be applied to the moving magnet type actuator by exchanging the locations of the permanent magnet 113 with the coils 125 and 126.

It should be further noted that locations of the focusing and tracking coils 126 and 125 may be changed with each other according to a design selection.

FIG. 11 illustrates a varied state of the springs 130 as the lens holder 122 is driven in the focusing direction according to an embodiment of the present invention and FIG. 10 illustrates a varied state of the springs 130 as the lens holder 122 is driven in the tracking direction according to an embodiment of the present invention.

Each of the springs 130 has the bends 131, 132, 133, 134, 135, and 136 so that the lens holder 122 can be effectively driven by the twisting and bending operation of the bends 131, 132, 133, 134, 135, and 136.

Figure 13:
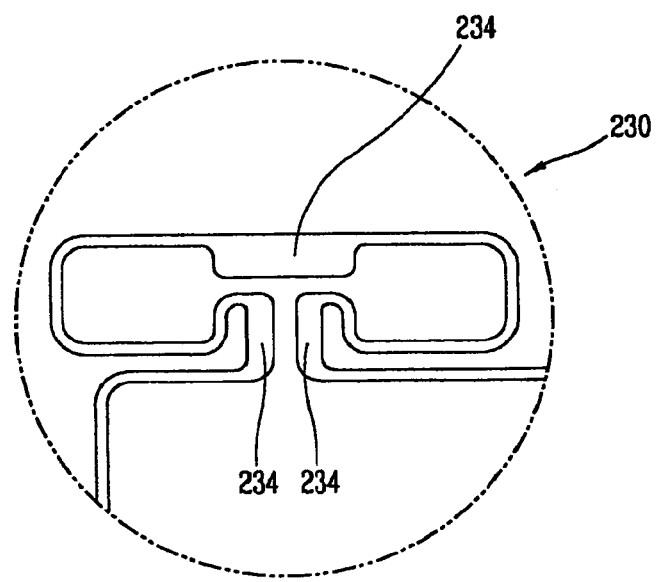
FIG. 13 is a view of a spring assembly of an actuator according to a modified example of the present invention.

FIG. 13 shows a spring 230 of an optical pick-up actuator according to another embodiment of the present invention.

The spring 230 is provided with a damping area 234 having a wider width. Damping material is deposited on the damping area 234.

Figure 14:
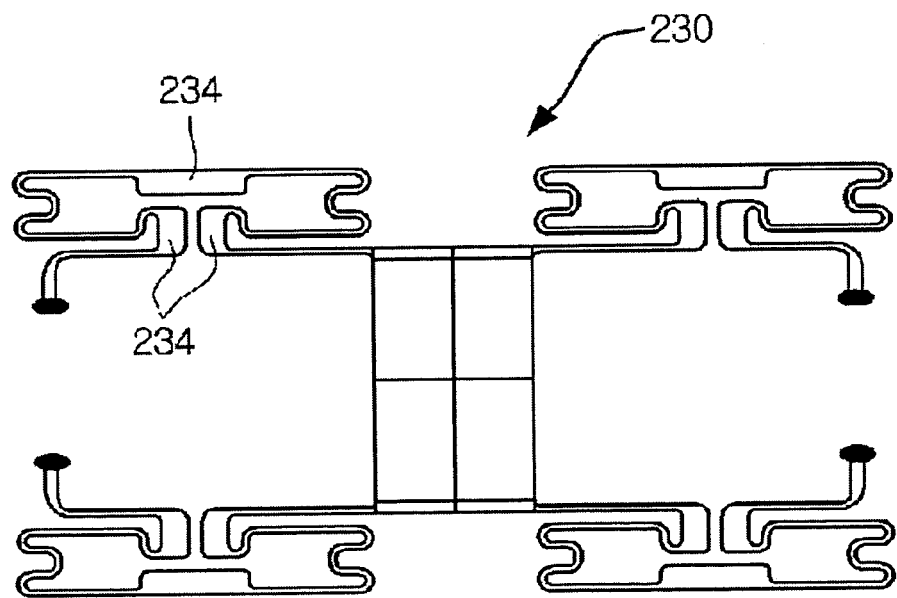
FIGS. 14 through 16 show views illustrating a variety of springs according to modified examples.
Figure 15:
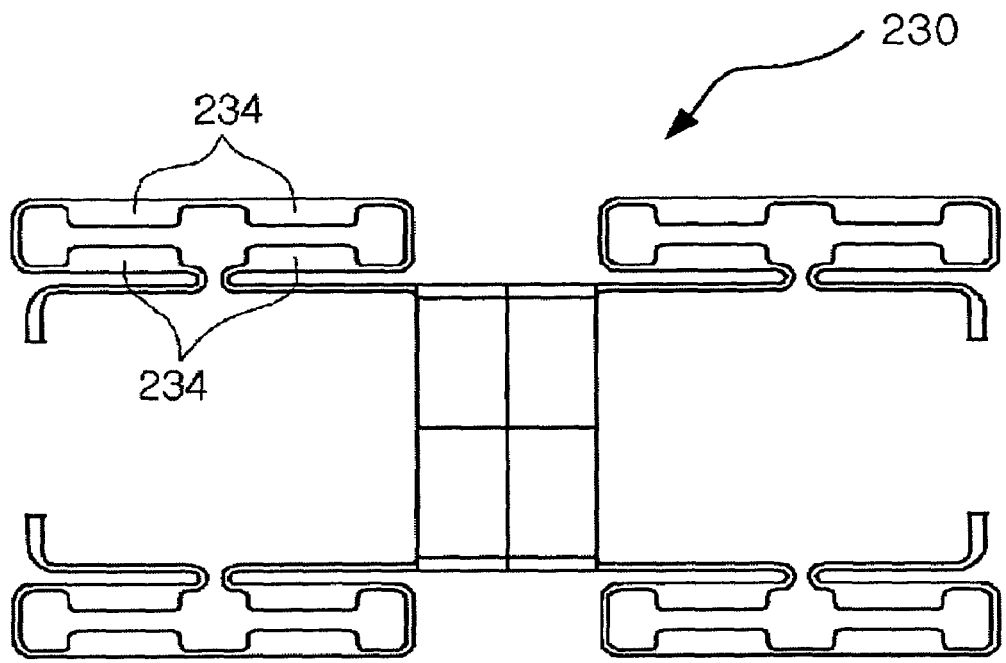

The spring 230 may have bends formed in a variety of shapes. FIGS. 12 and 14 show a variety of modified examples of the springs having different damping areas formed according to the bends.

The damping material such as gel type material is deposited on the damping area 234 and hardened by ultraviolet rays, thereby providing a damping property to the spring. Accordingly, the driving property of the actuator can be more improved.

Figure 17:
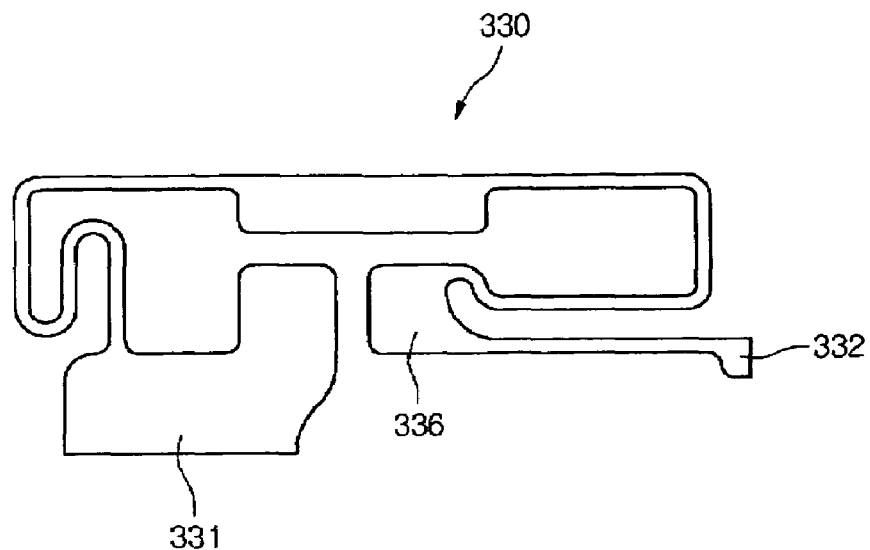
FIG. 17 is a view of a spring of an actuator according to a modified example of the present invention.
Figure 18:
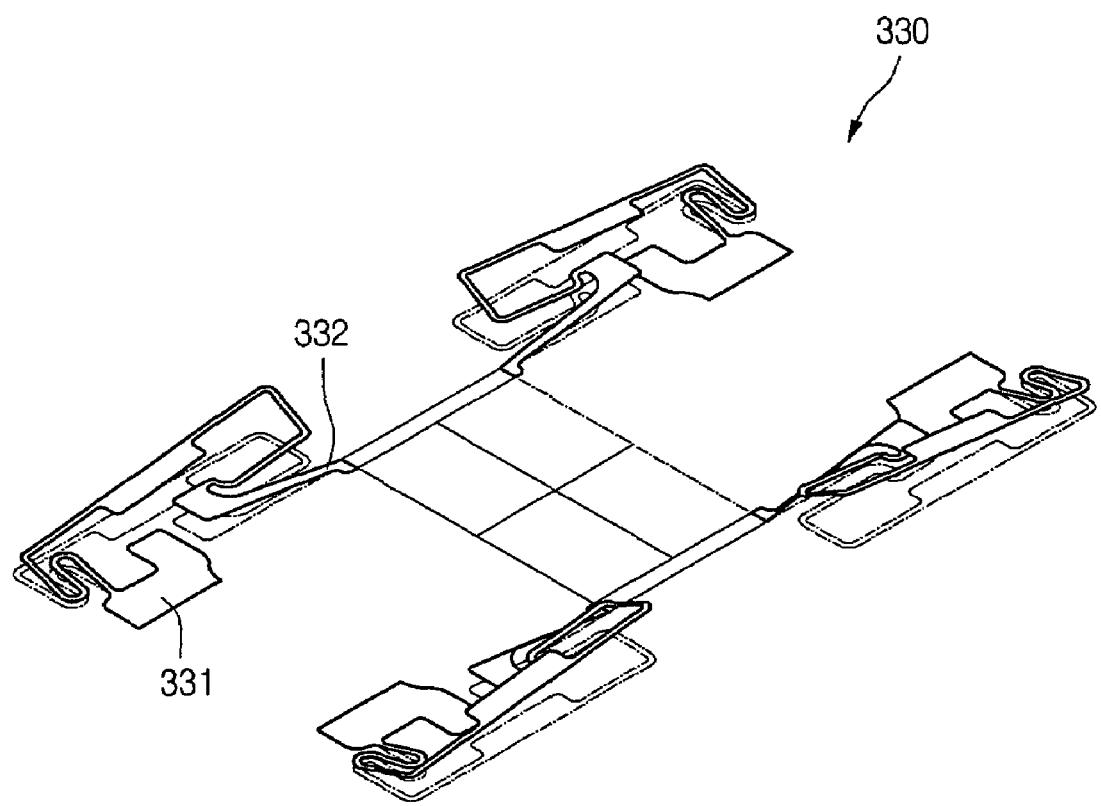
FIG. 18 is a view illustrating a varied state of springs as a lens holder is driven in a focusing direction according to an embodiment of the present invention.

FIG. 17 shows another modified example of the spring.

Referring to FIG. 17, a spring 330 of this example has a lens holder coupling portion 332 having a width greater than a portion between the lens holder coupling portion 332 and the first bend 336.

This is for reducing a fixed variation of the spring 330. That is, by differing the width of the lens holder coupling portion 332 from the portion between the lens holder coupling portion 332 and the first bend 336, the rigidities therebetween becomes different from each other.

As a result, an effective area of the spring 330 is defined on a front end of the lens holder coupling portion 332.

The spring coefficient K is generally determined at a less width portion of the spring. However, in this example, since the lens holder coupling portion 332 having the greater width is fixed on the lens holder, the spring coefficient K is increased, thereby reducing the fixed variation.

In addition, the actuator of the present invention has less size and weight compared with the prior actuator. In addition, a mass portion of the springs is about 20-30% of the actuator. Accordingly, the vibration generated by the springs does not remarkably affect the driving property of the actuator.

In order to effectively responding against the vibration of the springs 330 during the drive of the actuator, a stationary portion 331 is formed on a portion where the springs 330 are coupled to the fixing frame.

Figure 16:
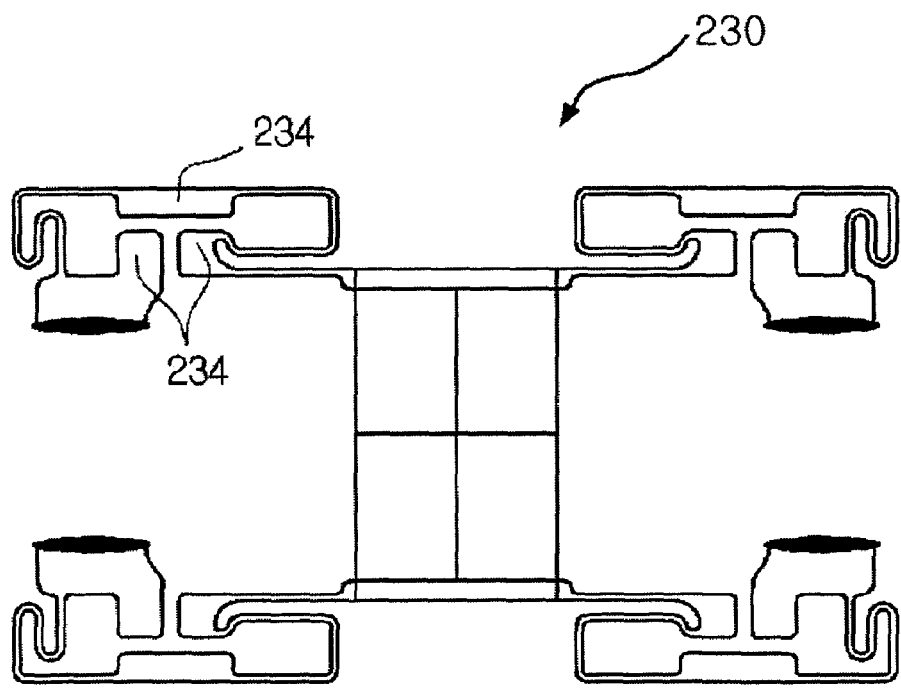

Here, the stationary portion 332 is coupled to the fixing frame, having a wider width than other portions. The stationary portion 332 is not affected by the movement of the lens holder, not functioning as the spring 330. That is, as shown in FIG. 16, as the lens holder moves, the spring 330 may be twisted or tensioned. However, the stationary portion 331 is not affected by the movement of the lens holder, being fixed on the fixing frame.

That is, by forming the lens holder coupling portion and the stationary portion 331, an actuator having a lower vibration property and an precise driving property can be realized.

As illustrated in conjunction with FIG. 11, a damper having the damping area 234 deposited with the damping material may be further formed to more effectively response to the vibration of the spring 330.

Figure 19:
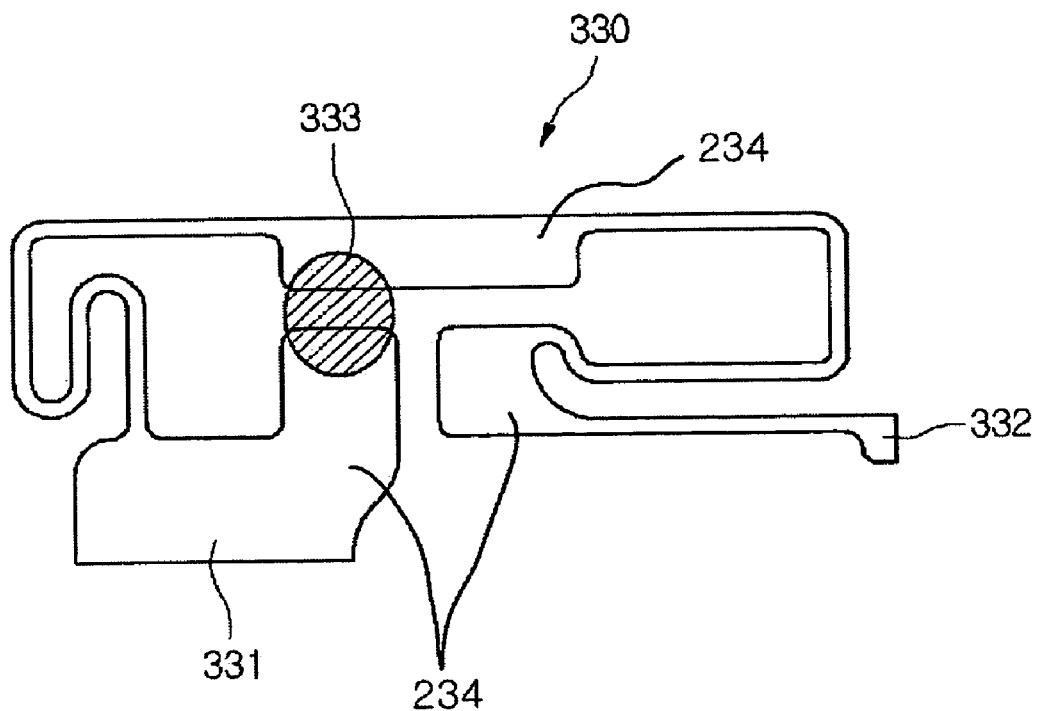
FIGS. 19 through 21 show a spring where damping material is deposited according to an embodiment of the present invention.
Figure 20:
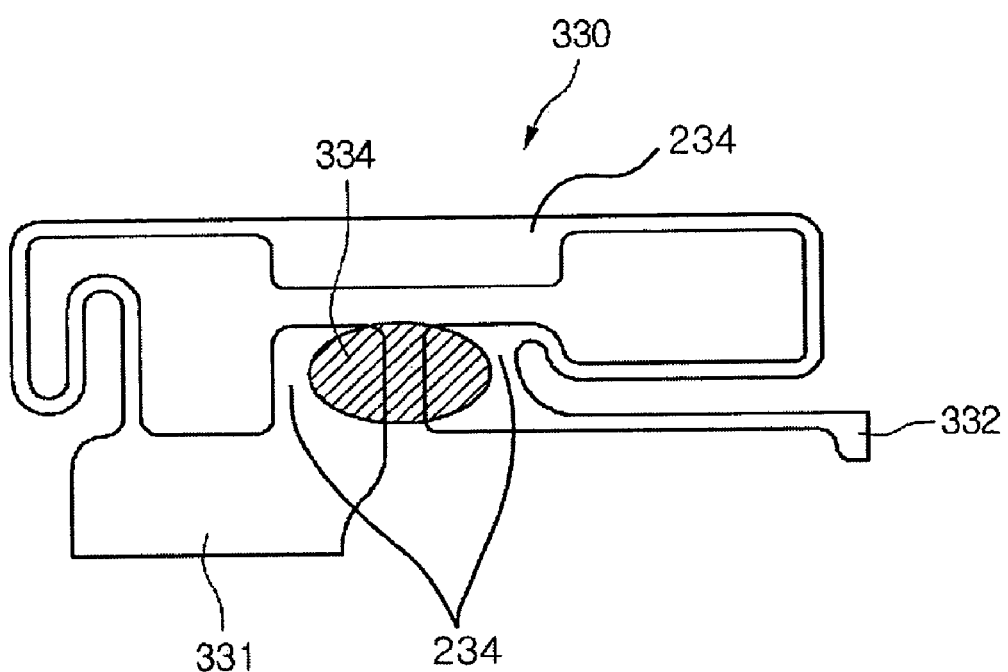
Figure 21:
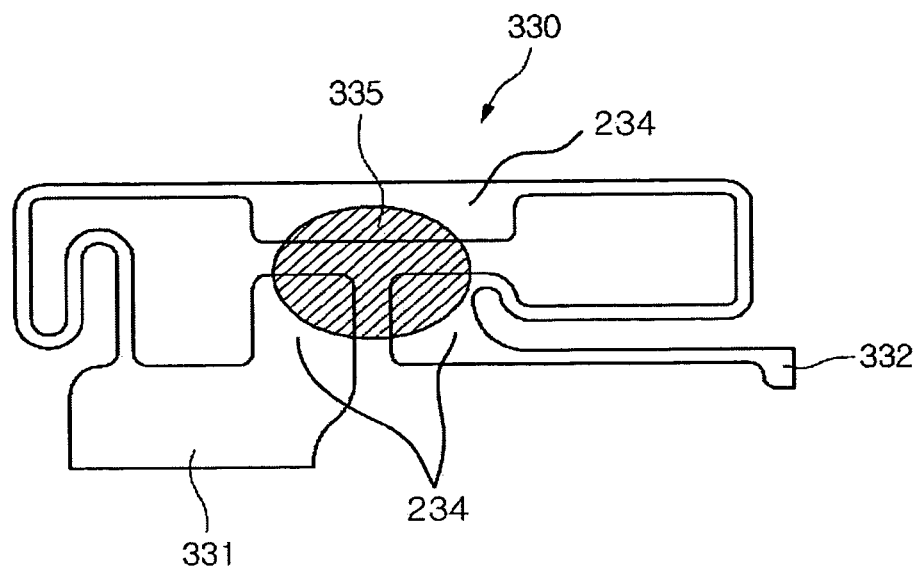

FIGS. 19 through 21 show an example where the damper is deposited on the damping area of the spring.

Dampers 333, 334 and 335 are formed on at least two areas including a damping area 234 of the stationary portion 331.

In the example depicted in FIGS. 19 and 20, the dampers 333 and 334 are formed on the damping area 234 of the stationary portion 331 and the damping area 234 of the spring 330. In FIG. 21, the dampers 335 are formed on the damping area 234 of the stationary portion 311 and two damping areas 234 of the spring 330.

By forming the dampers on the damping area 234 of the stationary portion 131, the unnecessary vibration of the spring 330 can be minimized.

Figure 22:
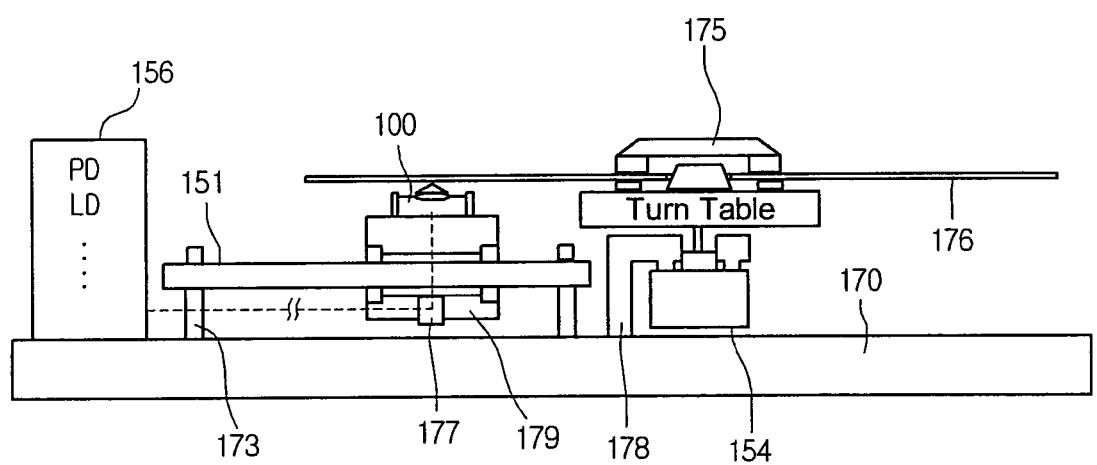
FIGS. 22 through 23 are views illustrating a structure supporting an optical pickup device of an optical reading/writing device according to an embodiment of the present invention.

FIG. 22 illustrates a supporting structure of an optical pickup device according to an embodiment of the present invention.

An optical pickup actuator 100 is provided and a pickup base 179 is formed to support the optical pickup actuator 100.

The pickup base 179 moves along the main shaft 151.

The main shaft 151 is supported by a main shaft holder 173 fixed on the base 170.

Also, a reflection mirror 177 is fixed to the pickup base 179 to reflect a light incident from an optical system 156 toward a focusing lens.

Here, the base 170 functions as a case for supporting the optical pickup device.

That is, unlike the prior art optical reading/writing device, the main shaft holder 173 is directly fixed on the base 170.

Further preferably, a spindle motor 174 may be fixed directly or by a spindle motor fixing member 178 on the base 170.

A turntable 175 may be disposed on a top of the spindle motor 174 so that the optical disk 176 can rotate by the turntable 175 driven by the rotation of the spindle motor 174.

An optical system 156 having a laser diode or a photo diode is separated from the optical pickup actuator 100 and fixed directly on the base 170.

Light radiated from the optical system 156 is reflected by the reflection mirror 177 disposed at the pickup base 179 and is then directed to the optical disk 176 via the focusing lens. On the contrary, light reflected from the optical disk 176 is reflected by the reflection mirror 177 and is then directed to the optical system 156.

Accordingly, it becomes possible to install the optical pickup actuator 100 and the optical system 156 on the base 170 in a state where they are separated from each other.

Figure 23:
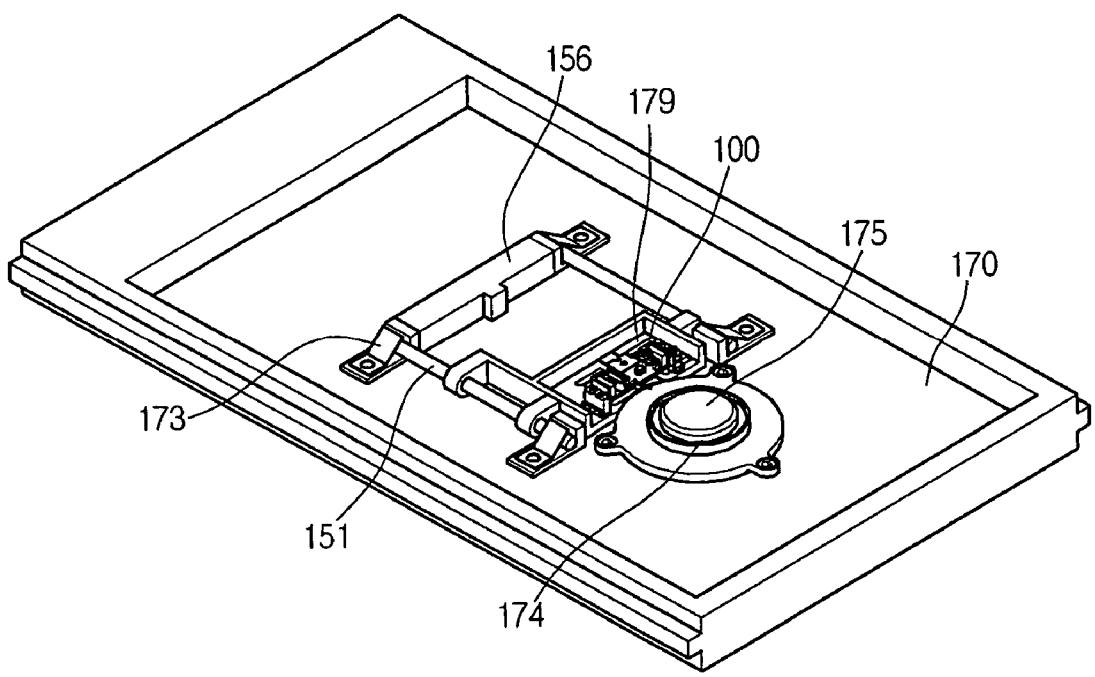

As shown in FIGS. 22 and 23, according to the optical reading/writing device, the main shaft holder 173 is directly fixed on the base 170. In addition, the optical system 156 and the spindle motor 174 are respectively formed on both sides of the base 170.

Hence, the rubber damper and the sled base that have been used in the prior optical reading/writing device can be omitted, thereby making it possible to reduce the size and weight of the optical reading/writing device.

Meanwhile, by minimizing the height of the optical reading/writing device, it becomes possible to reduce the size and weight of the optical reading/writing device.

A sled base or a supporting member similar to the sled base may be provided between the base 170 and the main shaft holder 173.

In this case, since a gap between the optical pickup actuator 100 and the base 170 is however determined according to the heights of the spindle motor 174 fixed on the base and the turntable 175 provided on the top of the spindle motor 174, a height of the sled base or the supporting member is designed to be less than that of the sled base used in the prior art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An actuator of an optical pick-up device comprising:
   two fixing frames;
   a lens holder disposed between the fixing frames and provided with a focusing lens and coils, the lens holder having a central portion thinner than a portion where the coils are located;
   springs supporting the lens holder, the springs connecting two points of each fixing frame to the lens holder, each spring having one or more bends;
   a permanent magnet disposed facing the coils to generate magnetic field; and
   a yoke forming a path of the magnetic field generated by the permanent magnet.

2. The actuator according to claim 1, wherein the lens holder is provided with spring fixing portions where the springs are fixed, and the spring fixing portions are formed on a same horizontal plane.

3. The actuator according to claim 1, wherein the coils include focusing and four tracking coils moving the lens holder in tracking and focusing directions, the tracking coils being disposed on both sides of the lens holder and the focusing coils being at least partly inserted in both sides of the lens holder.

4. The actuator according to claim 1, wherein the focusing lens is disposed at an eccentric portion from a center of the lens holder.

5. The actuator according to claim 1, wherein the lens holder is provided with a guide hole for accurately guiding the actuator on a jig during an assembling process.

6. The actuator according to claim 1, wherein the lens holder is provided at both sides with projections where coils are wound to supply electric power supplied from the springs.

7. The actuator according to claim 1, wherein the lens holder is provided at a bottom with a reinforcing member.

8. The actuator according to claim 1, wherein the spring is deposited with damping material at more than one portion, including a stationary portion formed on a portion where the spring is fixed on the fixing frame.

9. An actuator of an optical pick-up device comprising:
   two fixing frames;
   a lens holder disposed between the fixing frames and provided with a focusing lens and a space portion for an optical path, the space portion being formed on a lower portion of the lens holder;
   springs supporting the lens holder, the springs connecting the fixing frames to the lens holder; and
   a driving force generating unit to move the lens holder in tracking and focusing directions.

10. The actuator according to claim 9, wherein the driving force generating unit comprises tracking and focusing coils, a permanent magnet generating magnetic field, and a yoke providing a path for the magnetic field.

11. The actuator according to claim 9, wherein the spring is provided with one or more bends.

12. The actuator according to claim 9, wherein the focusing lens is disposed at an eccentric portion from a center of the lens holder.

13. The actuator according to claim 9, wherein the lens holder is provided with spring fixing portions where the springs are fixed, the spring fixing portions being disposed on a same horizontal plane.

14. The actuator according to claim 9, wherein the springs are leaf springs.

15. The actuator according to claim 9, wherein the springs are provided with a damping area.

16. An actuator of an optical pick-up device comprising:
    a fixing frame
    a lens holder provided with a focusing lens and a space portion, the space portion being formed thinly at a lower center portion for an optical path in a tracking direction;
    springs supporting the lens holder, the springs connecting the fixing frame to the lens holder, each spring having one or more bends; and
    a driving force generating unit for moving the lens holder in the tracking and focusing directions, the driving force generating unit comprising coils, a permanent magnet generating magnetic field, and a yoke providing a path for the magnetic field.

17. The actuator according to claim 16, wherein the focusing lens is disposed at an eccentric portion from a center of the lens holder.

18. The actuator according to claim 16, wherein the spring is fixed at four spring fixing portions of the lens holder, the spring fixing portions being disposed on a same horizontal plane.

19. The actuator according to claim 16, wherein the spring is deposited with damping material at more than one portion, including a stationary portion formed on a portion where the spring is fixed on the fixing frame.

20. The actuator according to claim 16, wherein the lens holder is provided with a guide hole for accurately guiding the actuator on a jig during an assembling process.

21. The actuator according to claim 16, wherein the lens holder is provided at both sides with projections where coils are wound to supply electric power supplied from the springs.

22. The actuator according to claim 16, wherein the lens holder is provided at a bottom with a reinforcing member.

23. The actuator according to claim 16, wherein the spring has a lens holder coupling portion having a width greater than a portion between the lens holder coupling portion and the bend.

* * * * *